United States Patent
Chen et al.

(10) Patent No.: US 8,749,513 B2
(45) Date of Patent: Jun. 10, 2014

(54) CAPACITIVE TOUCH PANEL

(75) Inventors: Po-Yang Chen, Miao-Li County (TW);
Po-Sheng Shih, Miao-Li County (TW);
Hsuan-Lin Pan, Miao-Li County (TW);
Tai-Shun Liao, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 737 days.

(21) Appl. No.: 12/878,035

(22) Filed: Sep. 9, 2010

(65) Prior Publication Data

US 2011/0069035 A1   Mar. 24, 2011

(30) Foreign Application Priority Data

Sep. 24, 2009   (CN) .......................... 2009 1 0307620

(51) Int. Cl.
*G06F 3/045*   (2006.01)
*G06T 1/00*   (2006.01)

(52) U.S. Cl.
USPC .......................................... 345/174; 345/418

(58) Field of Classification Search
USPC .................... 345/174, 173, 204, 176
See application file for complete search history.

(56) References Cited

U.S. PATENT DOCUMENTS

| | | | |
|---|---|---|---|
| 2005/0209392 A1* | 9/2005 | Luo et al. ....................... | 524/496 |
| 2009/0310007 A1* | 12/2009 | Matsui et al. .................. | 348/311 |
| 2010/0045610 A1* | 2/2010 | Hong et al. .................... | 345/173 |

* cited by examiner

*Primary Examiner* — Michael Faragalla
(74) *Attorney, Agent, or Firm* — WPAT, PC; Justin King

(57) ABSTRACT

A capacitive touch panel includes a first conductive film with anisotropic impedance, a second conductive film with conductive structures, and an insulating layer disposed between the first conductive film and the second conductive film. The conducting direction of the conductive structures is perpendicular to the direction of least impedance of the first conductive film.

14 Claims, 15 Drawing Sheets

CAPACITIVE TOUCH PANEL

BACKGROUND

1. Technical Field

The present disclosure generally relates to a touch panel, and more particularly to a capacitive touch panel structure with high throughput and sensitivity.

2. Description of Related Art

The typical capacitive touch panel mainly includes a capacity structure which is formed with two layers of Indium Tin Oxide (ITO) films and an insulating layer. When touching the touch panel by fingers to interference the electric field, the capacitance of the capacity structure may be changed. Detect the capacitance variations by driving and reading circuits, and the position of the touch point will be determined. FIG. 1A is a schematic diagram showing the patterned ITO film of a typical capacitive touch panel. Wherein, the diamond patterns of the ITO film 10A disposed on the top level and the ITO film 10B disposed on the bottom level are crisscross. Regarding the touch panel structure of FIG. 1A, the ITO films 10A, 10B disposed on the top level and the bottom level must be driving respectively to obtain the touch point. However, when touching at two touch points simultaneously, it cannot make sure of the positions of all touch points. FIG. 1B is a schematic diagram showing the patterned ITO film of another typical capacitive touch panel. Wherein, the overlapping region of the rectangular patterns of the ITO film 12A disposed on the top level and the ITO film 12B disposed on the bottom level may be defined a plurality of detection area. One or more touch points can be detected by driving one layer of the ITO film.

Whether the typical capacitive touch panel shown in FIG. 1A or FIG. 1B, semiconductor manufacturing techniques such as lithography, exposure and etching are utilized to form the patterning of the ITO films thereof. Many steps may be processed multifariously during manufacturing process, therefore causing it to be unable to improve the efficiency of the touch panel and to decrease the manufacturing cost and time. Moreover, due to the restriction of resolution of manufacturing process, it is unable to breaks through the bottleneck over the sensing precision of the typical touch panel.

Accordingly, the carbon nanotube (CNT) films are used to substitute for the ITO films recently. The CNT film has anisotropic impedance, i.e., its impedance in a first direction is least but in a second direction which is perpendicular to the first direction is biggest. FIG. 1C is a schematic diagram showing the capacitive touch panel with CNT films, which mainly includes a top layer of CNT film 14A, a bottom layer of CNT film 14B and an insulating layer disposed between the CNT films 14A, 14B. Wherein, the direction of the least impedance of the top layer of CNT film 14A is perpendicular to the direction of the least impedance of the bottom layer of CNT film 14B. The throughput of the CNT capacitive touch panel shown in FIG. 1C is greater than the ITO capacitive touch panels shown in FIG. 1A, 1B. However, when touching the touch panel, the electric fields of two layers of CNT films 14A, 14B are not easy to be interfered, and it causes that the capacitance variation is too small to improve sensitivity.

Accordingly, a need has arisen to propose a novel capacitive touch panel with high throughput and sensitivity.

SUMMARY

According to the embodiments of the present disclosure, the capacitive touch panel includes a first conductive film with anisotropic impedance, a second conductive film with conductive structures, and an insulating layer disposed between the first conductive film and the second conductive film. The conducting direction of the conductive structures is perpendicular to the direction of least impedance of the first conductive film. In a specific embodiment, the first conductive film is a CNT film, and the second conductive film has patterned elongated conductive structures which are parallel and separated in a default distance each other.

DETAILED DESCRIPTION OF THE DISCLOSURE

Figure 1A:
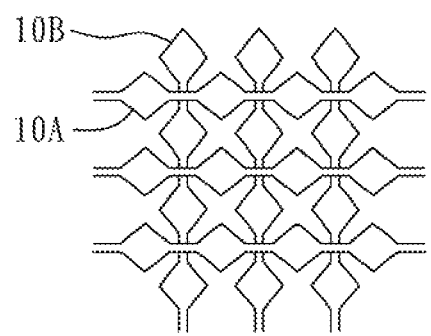
FIG. 1A is a schematic diagram showing the patterned ITO film of a typical capacitive touch panel.
Figure 1B:
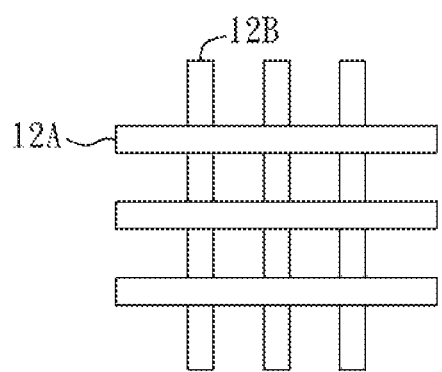
FIG. 1B is a schematic diagram showing the patterned ITO film of another typical capacitive touch panel.
Figure 1C:
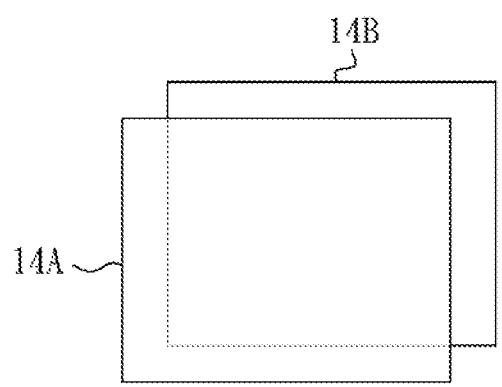
FIG. 1C is a schematic diagram showing the capacitive touch panel with CNT films.
Figure 2:
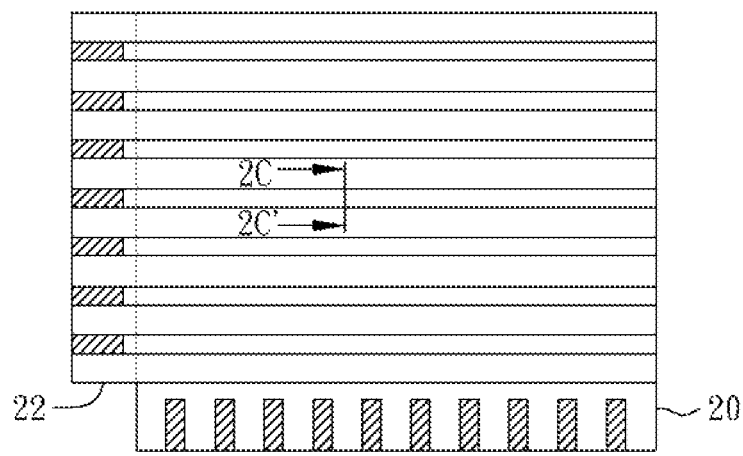
FIG. 2 is a top view showing a capacitive touch panel according to a first embodiment of the present disclosure.
Figure 3:
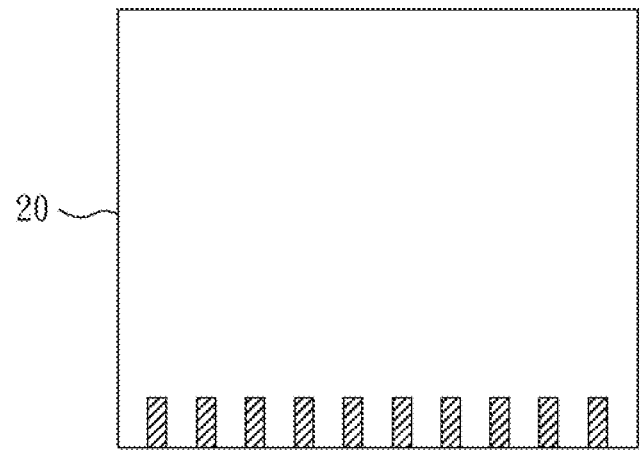
FIG. 3 is a decomposition diagram showing a capacitive touch panel according to a first embodiment of the present disclosure.
Figure 3:
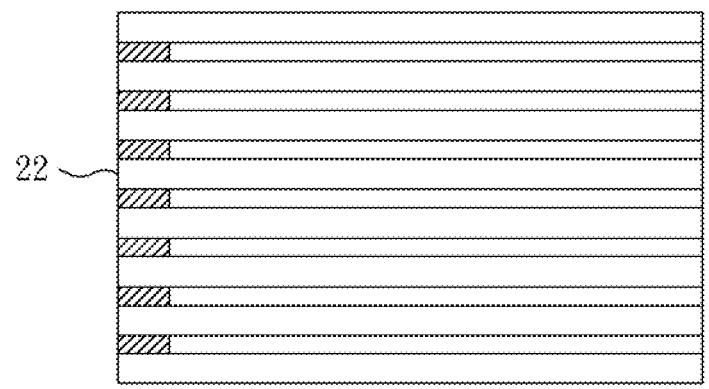

FIG. 2 is a top view showing a capacitive touch panel according to a first embodiment of the present disclosure. The capacitive touch panel mainly includes a first conductive film 20 and a second conductive film 22, and its decomposition diagram is shown as FIG. 3. The first conductive film 20 has anisotropic impedance. In FIG. 2, the impedance of the first conductive film 20 in the direction of vertical-axis is least but in the direction of horizontal-axis is biggest. In the present embodiment, the first conductive film 20 is a carbon nanotube (CNT) film or other material with anisotropic impedance. The manufacturing process of the CNT films is that the carbon nanotubes are formed firstly. Then, the carbon nanotubes are pulled one by one according to stretching technology. The front end and the back end of the each carbon nanotube may be connected due to Van Der Waals force, and further parallel alignment of conductive structures may be formed. The impedance of the CNT films in the stretching direction is least but in the direction which is perpendicular to the stretching direction is biggest, thereby forming anisotropic impedance characteristic.

The second conductive film 22 includes patterned conductive structures such as elongated conductive structures, which are parallel and separated in a default distance each other. The conducting direction of the conductive structures of the second conductive film 22 is perpendicular to the direction of the least impedance of the first conductive film 20. In the present embodiment, the second conductive film 22 is a patterned Indium Tin Oxide (ITO) film, other conventional conductive materials, or patterned films with anisotropic impedance such as CNT films. In the present embodiment, the ratio of the pitch of the adjacent elongated conductive structure to the width of each elongated conductive structure is about 5%-50%, but not limited to. For example, if the pitch of the elongated conductive structure is 5 mm, the width of the elongated conductive structure is about 0.25-2.5 mm.

Figure 4:
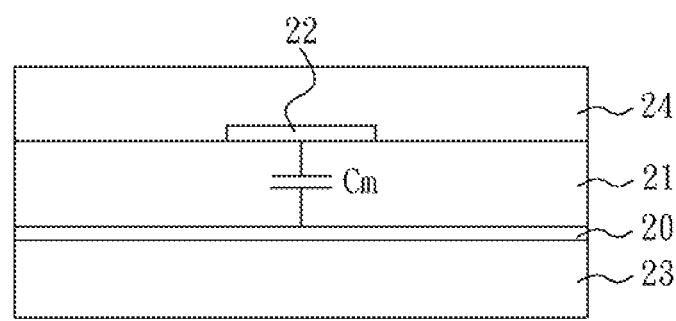
FIG. 4 is a cross-sectional view taken along a section line 2C-2C' of FIG. 2.

FIG. 4 is a cross-sectional view taken along a section line 2C-2C' of FIG. 2. According to the FIG. 4, an insulating layer 21 is disposed between the first conductive film 20 and the second conductive film 22, thereby forming a conductive structure and its capacitance is labeled as Cm. The outside of the first conductive film 20 usually includes a first protection layer 23 and the outside of the second conductive film 22 usually includes a second protection layer 24. Particularly, the first protection layer 23 is disposed on the one side of the first conductive film 20 opposite to the insulating layer 21 and the second protection layer 24 is disposed on the one side of the second conductive film 22 opposite to the insulating layer 21. The insulating layer 21, the first protection layer 23 or the second protection layer 24 may include conventional transparent insulating material such as Polyethylene (PE), Polycarbonate (PC), Polyethylene Terephthalate (PET), PolyMethyl MethAcrylate (PMMA) or thinned glass. Furthermore, the insulating layer 21 may also include Oxide or UV paste, and the first protection layer 23 or the second protection layer 24 may also include Oxide. The insulating layer 21, the first protection layer 23 or the second protection layer 24 can be pasted by optical adhesive such as Optical Clear Adhesive (OCA).

Figure 6:
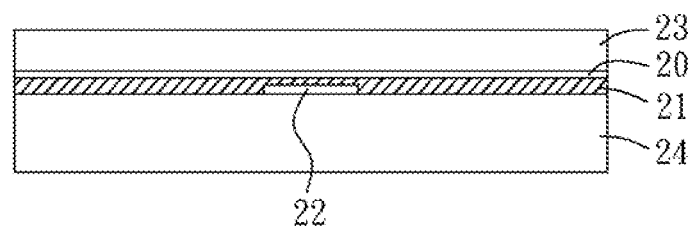
FIG. 6 illustrates a single-side manufacturing process of another touch panel.

The double-side, the single-side, or other appropriate manufacturing process may be utilized to manufacture the touch panel structure shown in FIG. 4. Take the double-side manufacturing process for example, the insulating layer 21 is used as a substrate, and the first conductive film 20 and the second conductive film 22 are formed in the both side of the substrate respectively. Finally, the first protection layer 23 and the second protection layer 24 are formed in the outside of the first conductive film 20 and the second conductive film 22 respectively. On the contrary, take the single-side manufacturing process for example, the first protection layer 23 is used as a substrate, and the first conductive film 20, the insulating layer 21, the second conductive film 22 and the second protection layer 24 are formed orderly on the first protection layer 23. FIG. 6 illustrates a single-side manufacturing process of another touch panel. Firstly, the second protection layer 24 is used as a substrate, and the second conductive film 22 is formed on the second protection layer 24. Then, the insulating layer 21 and the first conductive film 20 is covered orderly. Finally, the first protection layer 23 is formed on the first conductive film 20.

According to the electric capacity structure shown in FIG. 4, when touching the touch panel by fingers, i.e., when touching above the second conductive film 22, the electric field of the first conductive film 20 and the second conductive film 22 are interfered to change the capacitance Cm of the conductive structure. Due to the interval between the elongated conductive structures of the second conductive film 22, the electric field may be interfered violently. Compared with the typical CNT touch panel, the structure of the present embodiment can improve sensitivity. The interval size of the elongated conductive structure is decided according to the maximum interference of the electric field and the manufacturing factors such as throughput and efficiency.

Figure 5:
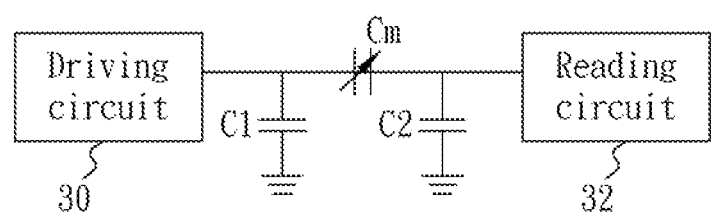
FIG. 5 shows that the first conductive film and the second conductive film are coupled to a driving circuit and a reading circuit respectively for locating the touch points.

As shown in FIG. 5, when the first conductive film 20 and the second conductive film 22 are coupled to a driving circuit 30 and a reading circuit 32 respectively, the touch points are decided by detecting the capacitance variations. The first capacity C1 stands for the capacitance between the second conductive film 22 and ground, and the second capacity C2 stands for the capacitance between the first conductive film 20 and ground. Although the first conductive film 20 is coupled to the driving circuit 30 and the second conductive film 22 is coupled to the reading circuit 32 in the present embodiment, the first conductive film 20 may be coupled to the reading circuit 32 and the second conductive film 22 be coupled to the driving circuit 30 in other embodiment.

Figure 7:
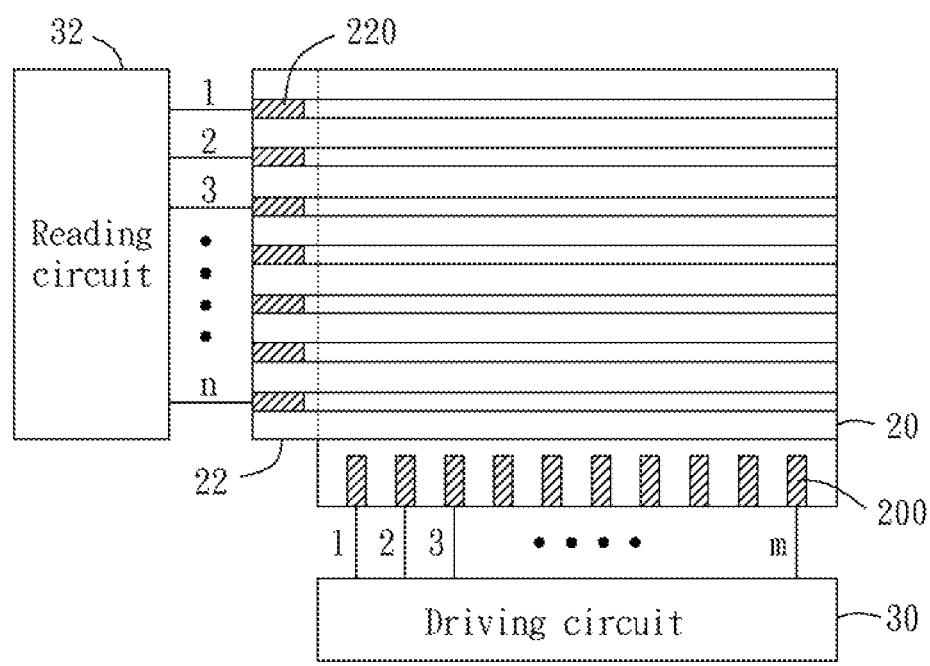
FIG. 7 is an implement embodiment of locating the touch points.
Figure 8:
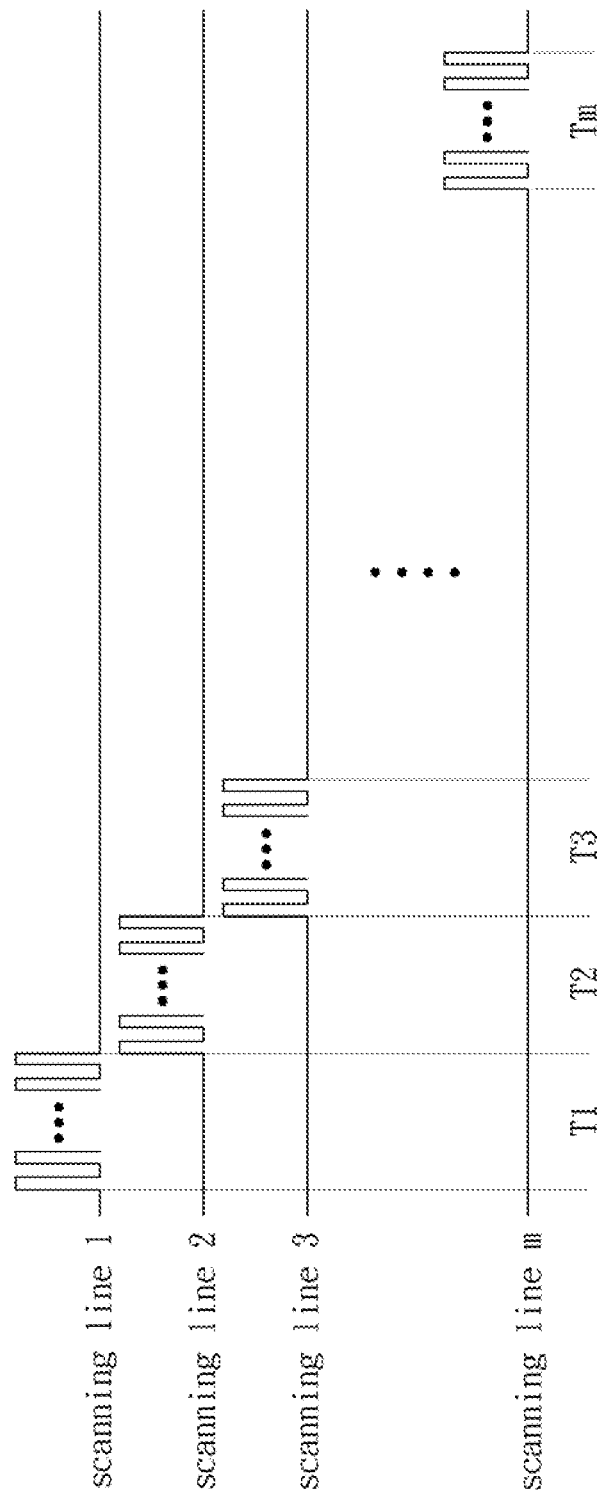
FIG. 8 is a timing diagram of scanning according to an embodiment of the present disclosure.
Figure 9:
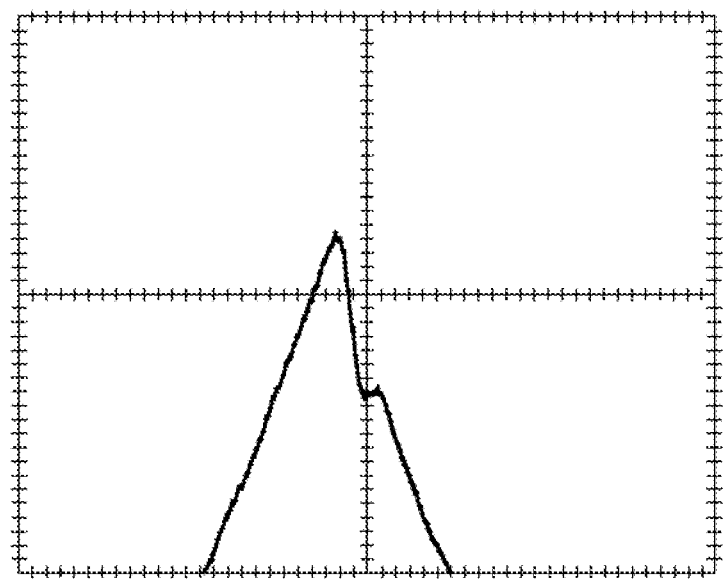
FIG. 9 is a waveform diagram exemplifying the regular reading signal without touching the touch panel.
Figure 10:
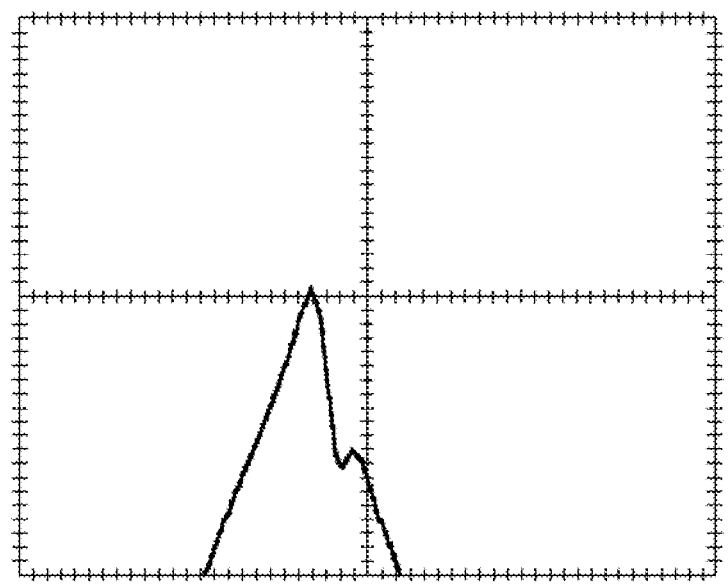
FIG. 10 is a waveform diagram exemplifying the reading signal when touching the touch panel.
Figure 11:
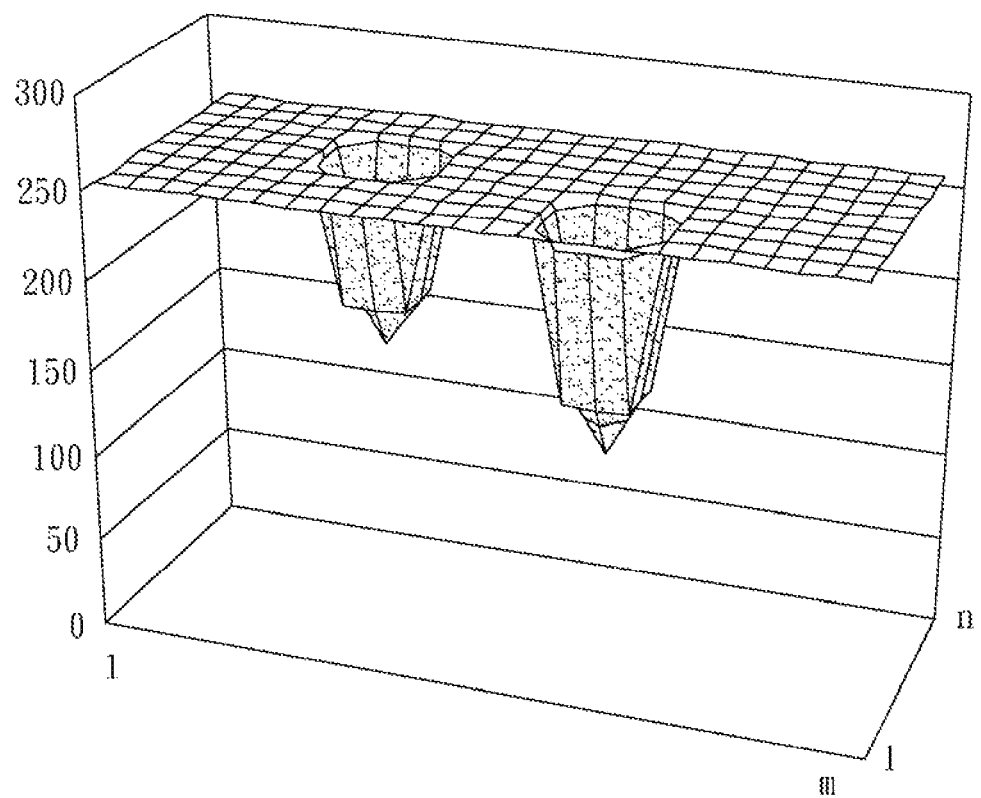
FIG. 11 exemplifies the values of the curve after a scanning cycle.

FIG. 7 is an implement embodiment of locating the touch points. In the embodiment, one side of the first conductive film 20 has a plurality of first metal electrodes 200 which are coupled with the driving circuit 30 for being as a scanning end, and one side of the second conductive film 22 has a plurality of second metal electrodes 220 which are coupled with the reading circuit 32 for being as a reading end. There are scanning lines 1-$m$ in the scanning end and reading lines 1-$n$ in the reading end. FIG. 8 is a timing diagram of scanning according to an embodiment of the present disclosure. Firstly, the driving circuit 30 inputs square-wave signal via the scanning line 1 and the reading circuit 32 reads n voltage values which correspond to the vertical-axis or Y-axis via the reading lines 1-$n$ respectively during T1. Similarly, during T2, the driving circuit 30 inputs square-wave signal via the scanning line 2 and the reading circuit 32 reads n voltage values which correspond to the vertical-axis or Y-axis via the reading lines 1-$n$ respectively. The same steps as above are repeated until the scanning line m, and then a scanning cycle is finished. After the scanning cycle, the value of m*n will be obtained. FIG. 9 is a waveform diagram exemplifying the regular reading signal without touching the touch panel. FIG. 10 is a waveform diagram exemplifying the reading signal when touching the touch panel, i.e., the amplitude of voltage is different from or less than the amplitude of the regular reading signal. If gathering all the m*n values obtained, the curve may be attained as shown in FIG. 11. The position of the amplitude of minimum voltage stands for the position of the touch point. It is noteworthy that multi-touch points touched simultaneously may be detected by the touch panel structure and the scanning located method of the present embodiment.

Figure 12:
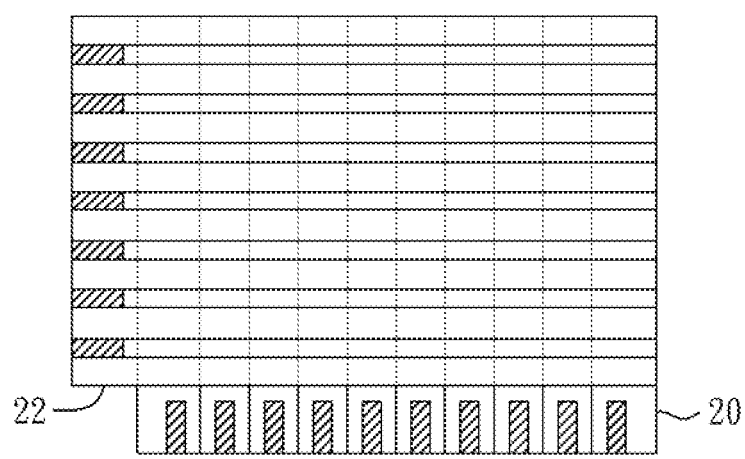
FIG. 12 is a top view showing a capacitive touch panel according to a second embodiment of the present disclosure.
Figure 13:
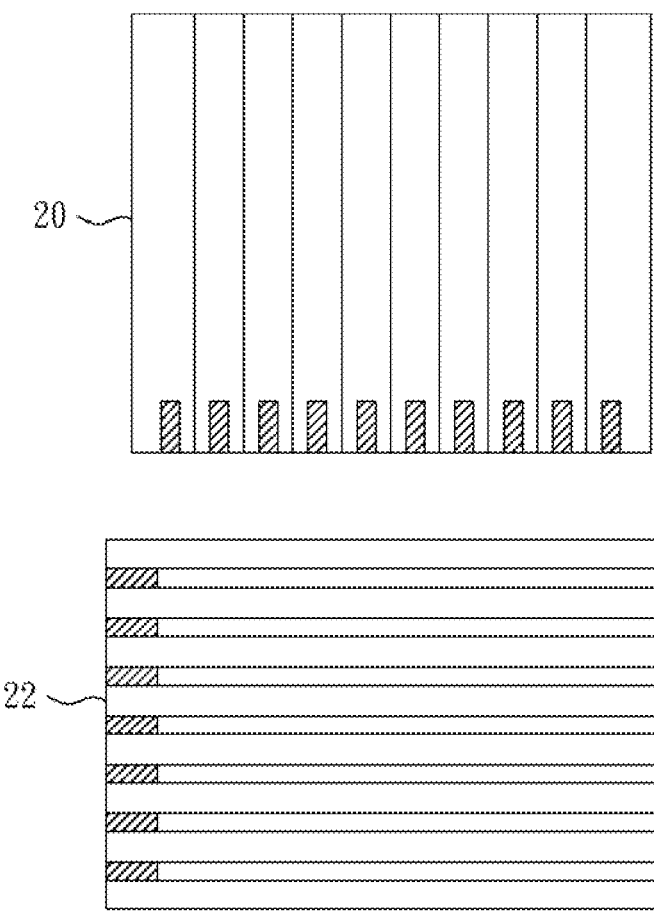
FIG. 13 is a decomposition diagram showing a capacitive touch panel according to a second embodiment of the present disclosure.

FIG. 12 is a top view showing a capacitive touch panel according to a second embodiment of the present disclosure, and its decomposition diagram is shown as FIG. 13. Differ from the first embodiment, the first conductive film 20 of the present embodiment, such as CNT film, is cut along the direction of the least impedance such as the vertical direction as shown in FIG. 12 to form the separated blocks. The cross-sectional structure, material, manufacturing process and scanning method of the present embodiment is similar to the first embodiment, thereby no more unnecessary details.

Although specific embodiments have been illustrated and described, it will be appreciated by those skilled in the art that various modifications may be made without departing from the scope of the present disclosure, which is intended to be limited solely by the appended claims.

What is claimed is:

1. A capacitive touch panel, comprising:
a first conductive film having anisotropic impedance;
a second conductive film having conductive structures;
an insulating layer disposed between the first conductive film and the second conductive film;
wherein the conducting direction of the conductive structures is perpendicular to the direction of least impedance of the first conductive film;
wherein the conductive structures of the second conductive film comprise elongated conductive structures, and the conductive structures of the second conductive film are parallel to each other and separated in a default distance; and
wherein the ratio of the pitch of the adjacent elongated conductive structure to the width of each elongated conductive structure is ranging from 5% to 50%.

2. The capacitive touch panel of claim 1, wherein the first conductive film comprises a carbon nanotube film.

3. The capacitive touch panel of claim 1, wherein the second conductive film comprises an Indium Tin Oxide film.

4. The capacitive touch panel of claim 1, wherein the second conductive film comprises an anisotropic impedance film.

5. The capacitive touch panel of claim 4, wherein the second conductive film comprises a carbon nanotube film.

6. The capacitive touch panel of claim 1, further comprising a first protection layer disposed on one side of the first conductive film opposite to the insulating layer.

7. The capacitive touch panel of claim 6, further comprising a second protection layer disposed on one side of the second conductive film opposite to the insulating layer.

8. The capacitive touch panel of claim 6, wherein the first protection layer includes Polyethylene (PE), Polycarbonate (PC), Polyethylene Terephthalate (PET), PolyMethyl MethAcrylate (PMMA), thinned glass, Oxide, optical adhesive or the combination thereof.

9. The capacitive touch panel of claim 7, wherein the second protection layer includes Polyethylene (PE), Polycarbonate (PC), Polyethylene Terephthalate (PET), PolyMethyl MethAcrylate (PMMA), thinned glass, Oxide, optical adhesive or the combination thereof.

10. The capacitive touch panel of claim 1, wherein the insulating layer includes Polyethylene (PE), Polycarbonate (PC), Polyethylene Terephthalate (PET), PolyMethyl MethAcrylate (PMMA), thinned glass, Oxide, optical adhesive, UV paste or the combination thereof.

11. The capacitive touch panel of claim 1, further comprising a driving circuit and a reading circuit, wherein one of the driving circuit and the reading circuit is coupled to the first conductive film and the other is coupled to the second conductive film.

12. The capacitive touch panel of claim 11, wherein the first conductive film has a plurality of first metal electrodes for coupling with the driving circuit or the reading circuit.

13. The capacitive touch panel of claim 12, wherein the second conductive film has a plurality of second metal electrodes for coupling with the driving circuit or the reading circuit.

14. The capacitive touch panel of claim 1, wherein the first conductive film is cut along the direction of the least impedance to form the separated blocks.

* * * * *